Oct. 26, 1965  E. C. MATTHEWS ETAL  3,213,938
HEAT EXCHANGERS
Filed Nov. 23, 1960  3 Sheets-Sheet 1

INVENTORS
ERIC C. MATTHEWS,
THOMAS THOMSON,
BY LEONARD W. WARREN

ATTORNEY

Oct. 26, 1965     E. C. MATTHEWS ETAL     3,213,938

HEAT EXCHANGERS

Filed Nov. 23, 1960     3 Sheets-Sheet 2

INVENTORS
ERIC C. MATTHEWS,
THOMAS THOMSON,
LEONARD W. WARREN,
BY
ATTORNEY

Oct. 26, 1965  E. C. MATTHEWS ETAL  3,213,938
HEAT EXCHANGERS
Filed Nov. 23, 1960  3 Sheets-Sheet 3

INVENTOR
ERIC C. MATTHEWS
BY THOMAS THOMSON,
LEONARD W. WARREN,

ATTORNEY 3,213,938
HEAT EXCHANGERS
Eric Charles Matthews, Mickleover, Thomas Thomson, Flaxholme, Duffield, and Leonard Wilfred Warren, Ticknall, England, assignors to International Combustion (Holdings) Limited, London, England, a British company
Filed Nov. 23, 1960, Ser. No. 71,189
Claims priority, application Great Britain, Nov. 27, 1959, 40,454/59
1 Claim. (Cl. 165—143)

The present invention relates to heat exchangers and has particular reference to heat exchangers for nuclear reactors using liquid metal as coolant, the liquid metal usually being an alkali metal or an alloy of alkali metals.

The usual cycle for liquid metal cooled nuclear reactors uses a primary circuit between the reactor core and a heat exchanger where the liquid metal is brought into heat exchange relationship with the secondary circuit containing a coolant fluid, usually water. As water and alkali metals are far from compatible, and the consequences of inter-circuit leakage therefore most undesirable, it is usually thought advisable to use a tertiary barrier fluid in the heat exchanger to separate the two circuits. This leads inevitably to increased heat losses; further, the tertiary fluid has to be compatible both with water and with the alkali metal and to be acceptable on the scores of corrosion, heat transfer efficiency and nuclear compatibility. A fluid which fully measures up to these requirements would inevitably replace the alkali metal itself.

It is an object of the present invention to provide a heat exchanger for a liquid metal cooled reactor which permits the omission of a tertiary fluid.

It is also an object of the present invention to provide an element for a two-fluid heat exchanger for a liquid metal cooled nuclear reactor.

By way of example only, a heat exchanger for a nuclear reactor utilizing a liquid sodium reactor core coolant in conjunction with water as coolant fluid for the liquid sodium will now be described with reference to the accompanying drawings in which:

FIGS. 1A and 1B together show a schematic section of a sodium/water heat exchanger.

Figure 1A:
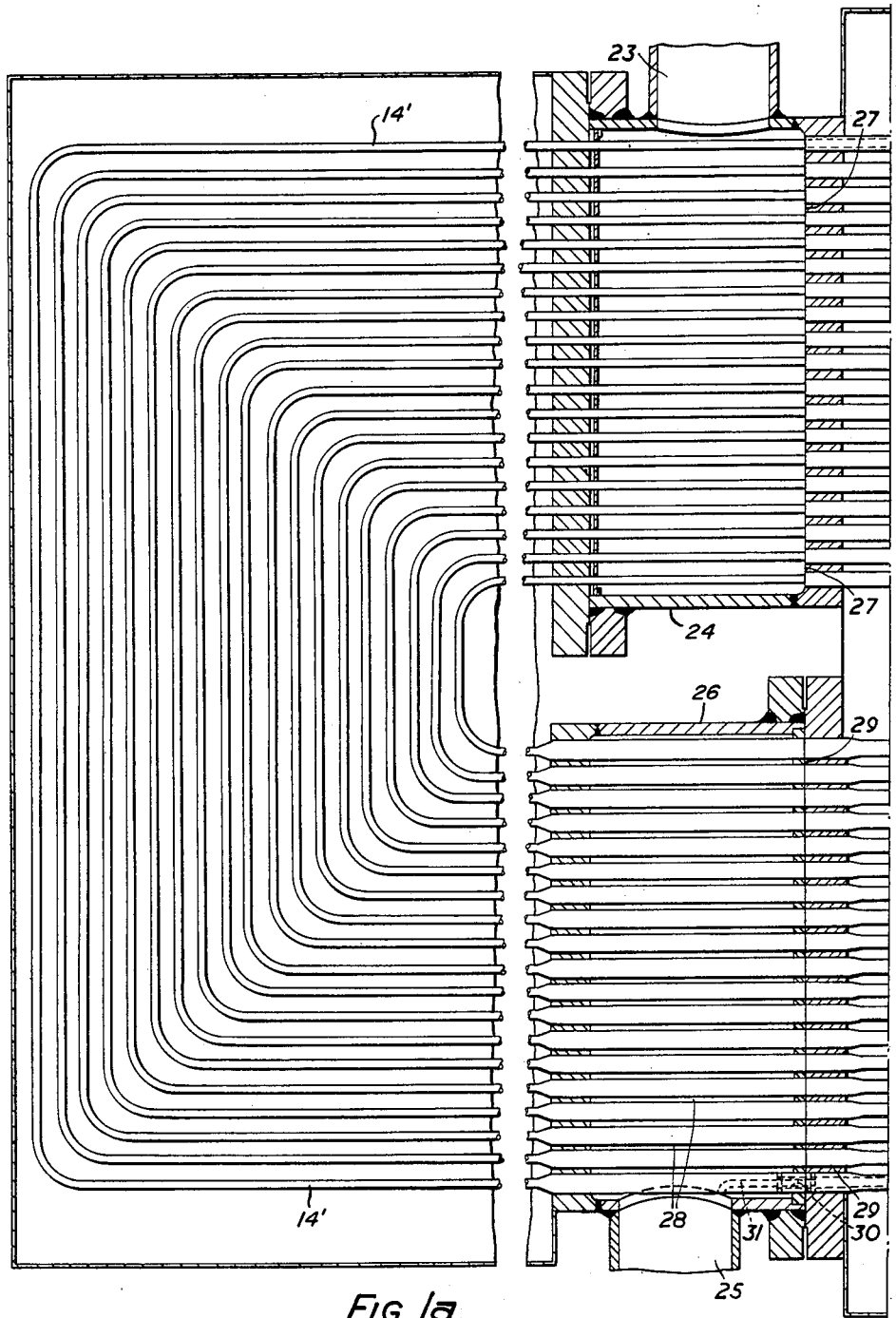
Figure 1B:
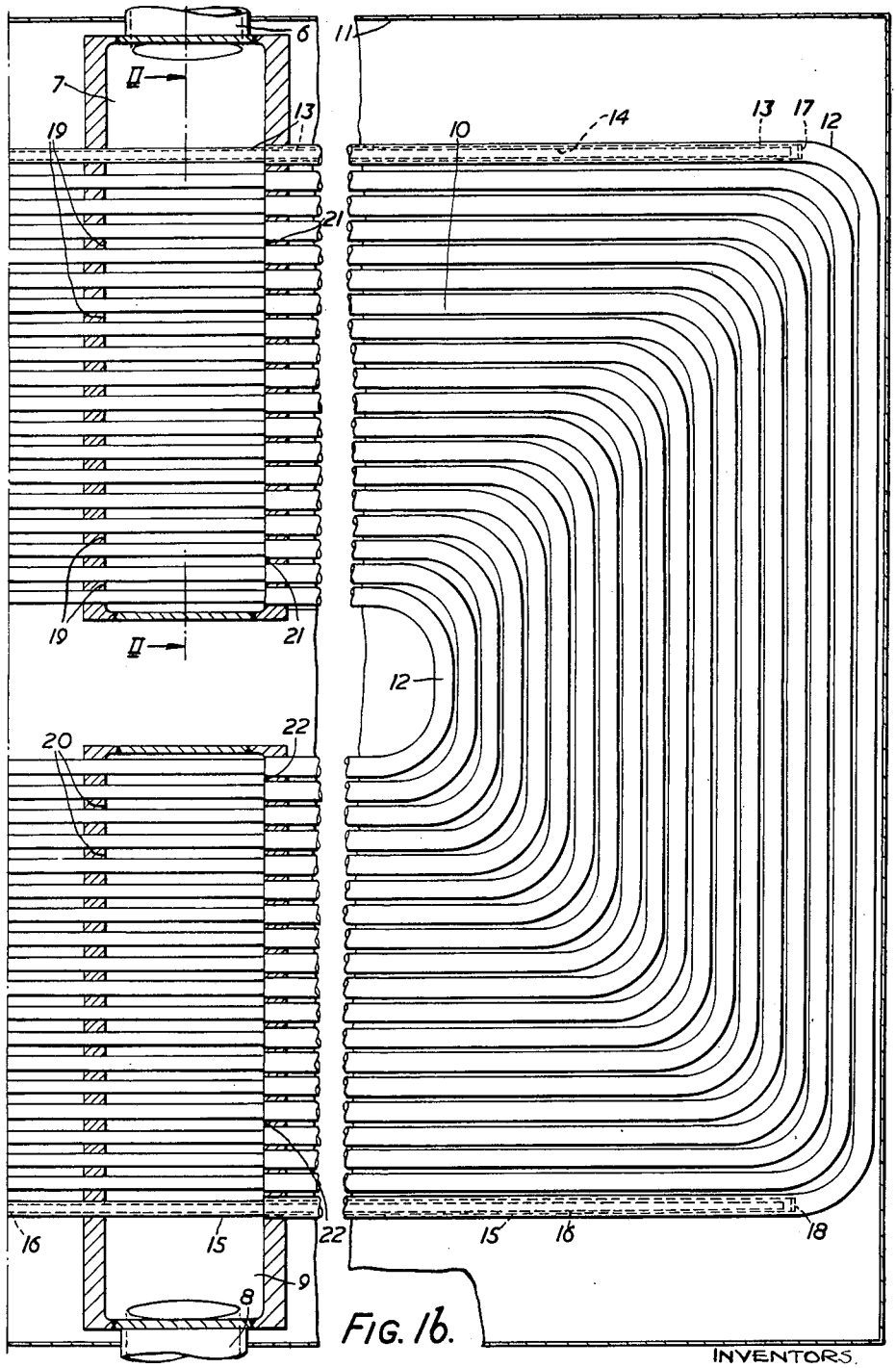

The sodium side of the heat exchanger comprises a sodium inlet 6 leading to a hot sodium chest 7, and a sodium outlet 8 leading from a cold sodium chest 9. U-shaped tubular elements 10 connect the hot sodium chest 7 with the cold sodium chest 9, the elements 10 and the chests 7, 9 being contained within a tank 11 which is filled with a quantity of inert gas to form a low pressure inert jacket for the sodium side of the heat exchanger.

Figure 2:
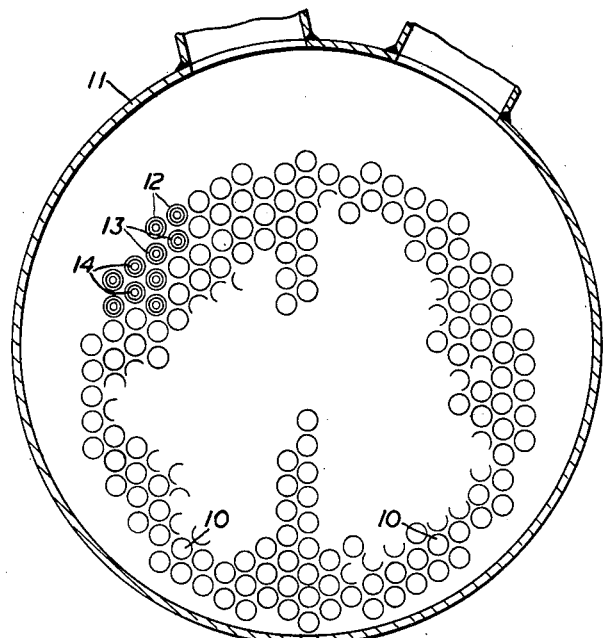
FIG. 2 is a section on line II—II of FIG. 1B.
Figure 3:
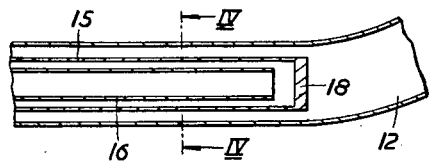
FIG. 3 is a detail of FIG. 1 on a larger scale.
Figure 4:
FIG. 4 is a section on line IV—IV of FIG. 3.

The tubular elements 10 each comprise a U-shaped outer tube 12, a blind middle tube 13 and an open inner tube 14 (FIG. 2) located coaxially in one limb of the U, and a blind middle tube 15 and an open inner tube 16 located in the other limb of the U. The ends of the inner tubes 14, 16, extending within the middle tubes 13, 15 are respectively spaced from ends 17, 18 of the middle tubes 13, 15 (FIG. 3).

The outer tubes 12 connect the hot sodium chest 7 to the cold sodium chest 9. The inner tubes 14, 16 and the middle tubes 13, 15 pass through the sodium chests 7, 9 to the water side of the heat exchanger and are sealed into the sodium chests 7, 9 by welds 19, 20 respectively. The outer tubes 12 are welded to tube plates 21, 22 to complete the sodium circuit of the heat exchanger.

The water side of the heat exchanger comprises a water outlet 23 leading from a hot water chest 24 which is located outside the tank 11 adjacent the hot sodium chest 7, and a water inlet 25 leading from a cold water chest 26 which is located outside the tank 11 adjacent the cold sodium chest 9.

Figure 5:
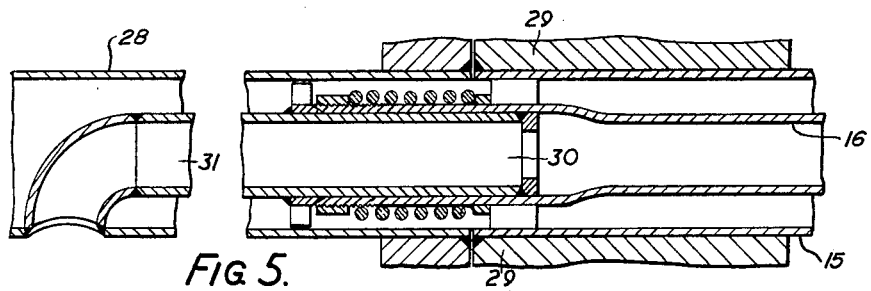
FIG. 5 is a detail of FIG. 1A on a still larger scale.

The middle tubes 13 which pass through the hot sodium chest 7 are welded to tube plate 27 of the hot water chest 24. The inner tubes 14 located within the middle tubes 13 also pass through the hot water chest 24 to the cold water chest 26, where they are joined to wide tubes 28 which pass through the cold water chest 26 and are then joined to the middle tubes 15 which pass through the cold sodium chest 9. The inner tubes 16 which pass through the cold sodium chest 9 are mechanically connected at tube plate 29 to orifice nozzles 30 (FIG. 5) connected to the water inlet 25.

In operation, sodium heated by a nuclear reactor (not shown) enters the heat exchanger through sodium inlet 6. The sodium passes from the hot sodium chest 7 to the cold sodium chest 9 through the outer tubes 12, passing along the annular spaces between the outer tubes 12 and the middle tubes 13, 15, giving up heat to water flowing through the annular spaces betwen the middle tubes 13, 15 and the inner tubes 14, 16 respectively as it does so. The sodium then passes from the cold sodium chest 9 through the sodium outlet 8 whence it is returned to the nuclear reactor to complete the primary sodium coolant circuit.

The feed water to be heated enters the water inlet 25 and passes through small pipes 31 and the orifice nozzles 30 to the inner tubes 16. The water flows along the inner tubes 16 until its flow is reversed by the blanked ends 18 of the middle tubes 15. It then flows through the annular spaces between the inner tubes 16 and the middle tubes 15 in parallel flow to the sodium in the annular space between the middle tubes 15 and the outer tubes 12, the water taking heat from the sodium as it does so. The water than passes from the middle tubes 15 through the wide tubes 28 and extensions 14' of the inner tubes 14 which pass through the hot water chest 24 (where some heat is absorbed from the water in the chest) and extend within the middle tubes 13 passing through the hot sodium chest 9. The water flows along the inner tubes 14 until its flow is reversed by the blanked ends 17 of the middle tubes 13. It then flows through the annular spaces between the inner tubes 14 and the middle tubes 13 in contra flow to the sodium in the annular space between the middle tubes 13 and the outer tubes 12, heat being passed from the sodium to the water. The water then passes through the hot water chest and leaves by the water outlet whence it passes to give up its useful heat.

The arrangement of the heat exchanger is such that the welds 19 separate the hottest sodium from the hottes water and the welds 20 separate the coldest sodium from the coldest water. The temperature gradients across the welds 19, 20 are thus minimised, thus reducing the pos sibility of failure of these welds, which are the weakes point separating the sodium circuit from the water circuit The arrangement also allows for unrestricted expan sion of the tubular elements, each of which is held a the ends of the U only, the loop of the U-tube being sus pended freely in the tank.

In a preferred arrangement, the sodium circuit of a liquid metal cooled nuclear reactor comprises two sucl heat exchangers in series, at least the first part of the firs heat exchanger being for raising the temperature of the feed-water up to saturation temperature and at least the final part of the second heat exchanger being used fo steam produced by boiling the water in the heat exchang ers between said first part of the first heat exchanger and said final part of the second heat exchanger.

In the event of failure of a tubular element 10, the element can be removed and the resultant aperture blanked-off at the tube plates. The remaining elements are not affected although the available heat transfer surface of the heat exchanger is reduced in proportion to the number of elements removed.

We claim:

A heat exchanger for bringing first and second fluids into heat exchanging relationship comprising in combination an inlet chest and an outlet chest for said first fluid, a plurality of flow tubes for said first fluid, each tube of said plurality of flow tubes being connected at one end to said first fluid inlet chest and at the other end to said first fluid outlet chest, a second fluid inlet chest adjacent said first fluid outlet chest, a second fluid outlet chest adjacent said first fluid inlet chest, a series of flow tubes for said second fluid, each of said second fluid flow tubes extending from inside that one end of one of said plurality of flow tubes connected to said first fluid inlet chest and passing through said first fluid inlet chest through said adjacent second fluid outlet chest, through said second fluid inlet chest and into said other end of said one of the plurality of flow tubes where each said series of second fluid flow tubes is blanked-off, each of said series of second fluid flow tubes being apertured where it passes through said inlet chest for said second fluid, a plurality of second fluid go tubes, a plurality of second fluid return tubes, each of said plurality of second fluid return tubes communicating at one end with said second fluid outlet chest and extending through said first fluid inlet chest and into one of said plurality of flow tubes connected to said first fluid inlet chest, each said second fluid return tubes being located co-axially between flow tubes for said first and second fluids and being blanked-off at its end inside the first fluid flow tube, each of said second fluid go tubes being joined at one end to one of said apertures and extending internally of that one of said second fluid flow tubes in which the aperture is formed through said first fluid outlet chest towards the blanked-off end of said one second fluid flow tube.

References Cited by the Examiner

UNITED STATES PATENTS

| 784,716 | 3/05 | Voorhees | 257—246 |
| 2,362,985 | 11/44 | Brown | 257—246 |
| 2,390,436 | 12/45 | Gunter | 165—142 X |
| 2,708,656 | 5/55 | Fermiet et al. | 204—193.2 |
| 2,841,545 | 7/58 | Zinn | 204—193.2 |
| 3,054,599 | 9/62 | Fabregas | 165—142 X |

FOREIGN PATENTS

| 640,680 | 7/50 | Great Britain. |

ROBERT A. O'LEARY, *Primary Examiner.*

CARL D. QUARFORTH, CHARLES SUKALO,
*Examiners.*